(12) United States Patent
Adachi et al.

(10) Patent No.: US 8,424,746 B2
(45) Date of Patent: Apr. 23, 2013

(54) METHOD OF MANUFACTURING OPTICAL COMPONENT AND OPTICAL COMPONENT

(75) Inventors: Kazumasa Adachi, Sayama (JP); Motoo Takada, Sayama (JP); Kozo Ono, Sayama (JP)

(73) Assignee: Nihon Dempa Kogyo Co., Ltd., Tokyo (JP)

( * ) Notice: Subject to any disclaimer, the term of this patent is extended or adjusted under 35 U.S.C. 154(b) by 487 days.

(21) Appl. No.: 12/590,915

(22) Filed: Nov. 16, 2009

(65) Prior Publication Data
US 2010/0136306 A1 Jun. 3, 2010

(30) Foreign Application Priority Data
Dec. 1, 2008 (JP) .................. 2008-306723

(51) Int. Cl.
- B23K 20/00 (2006.01)
- C03B 23/20 (2006.01)
- C03B 27/00 (2006.01)

(52) U.S. Cl.
USPC ........... 228/121; 228/193; 228/194; 228/254; 65/36; 65/42; 65/43

(58) Field of Classification Search .................. None
See application file for complete search history.

(56) References Cited

U.S. PATENT DOCUMENTS

| | | | | |
|---|---|---|---|---|
| 4,196,837 A * | 4/1980 | Burkart et al. | ................. | 228/116 |
| 4,826,787 A * | 5/1989 | Muto et al. | ................. | 228/193 |
| 5,248,079 A * | 9/1993 | Li | ................. | 228/121 |
| 5,726,805 A * | 3/1998 | Kaushik et al. | ................. | 359/589 |
| 7,045,441 B2 * | 5/2006 | Chang et al. | ................. | 438/458 |
| 7,166,487 B2 * | 1/2007 | Takada et al. | ................. | 438/33 |
| 7,186,461 B2 * | 3/2007 | Rita | ................. | 428/426 |
| 7,399,512 B2 * | 7/2008 | Takada et al. | ................. | 428/68 |
| 7,572,349 B2 * | 8/2009 | Takada et al. | ................. | 156/264 |
| 7,891,486 B2 * | 2/2011 | Takada et al. | ................. | 206/316.1 |
| 7,963,435 B2 * | 6/2011 | Sato et al. | ................. | 228/225 |
| 8,075,947 B2 * | 12/2011 | Kikegawa et al. | ................. | 427/162 |
| 8,078,712 B2 * | 12/2011 | DeHaan et al. | ................. | 709/223 |
| 8,233,219 B2 * | 7/2012 | Takada et al. | ................. | 359/588 |
| 2004/0180518 A1 * | 9/2004 | Chang et al. | ................. | 438/487 |
| 2008/0037944 A1 * | 2/2008 | Sugita et al. | ................. | 385/131 |
| 2008/0055717 A1 * | 3/2008 | Pradhan et al. | ................. | 359/360 |
| 2008/0261029 A1 | 10/2008 | Andersson | | |
| 2011/0019296 A1 * | 1/2011 | Yamamoto et al. | ................. | 359/885 |
| 2012/0263872 A1 * | 10/2012 | Takada et al. | ................. | 427/162 |

FOREIGN PATENT DOCUMENTS

| | | | |
|---|---|---|---|
| JP | 04-268225 A | * | 9/1992 |
| JP | 7-086106 | | 3/1995 |
| JP | 2003-084255 | | 3/2003 |
| JP | 2006-248895 | | 9/2006 |
| JP | 2007-041117 | | 2/2007 |
| JP | 2008-532802 | | 8/2008 |

* cited by examiner

*Primary Examiner* — Kiley Stoner
(74) *Attorney, Agent, or Firm* — Jordan and Hamburg LLP

(57) ABSTRACT

To easily bond substrates even made of materials whose linear expansion coefficients are different from each other when manufacturing an optical component used by transmitting light through an inside thereof.

Buffer layers made of an amorphous inorganic substance causing a brittle fracture are formed on bonding surfaces of a plurality of substrates having linear expansion coefficients different from one another, and the substrates to be bonded are stacked so that the buffer layers are faced to each other. Then, a heat treatment is performed for a stack, and thereby direct bonding via an atom is formed between the buffer layers.

5 Claims, 12 Drawing Sheets

(a)

(b)

Fig. 3
(a)
1(2) SUBSTRATE
(b)
1(2)
(c)
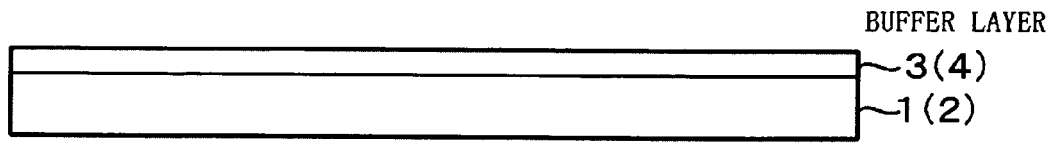
BUFFER LAYER
3(4)
1(2)

(a) Fig. 4
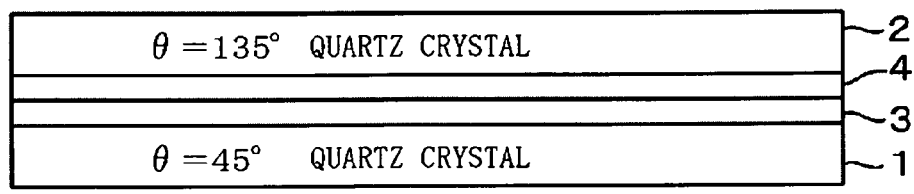
(b)
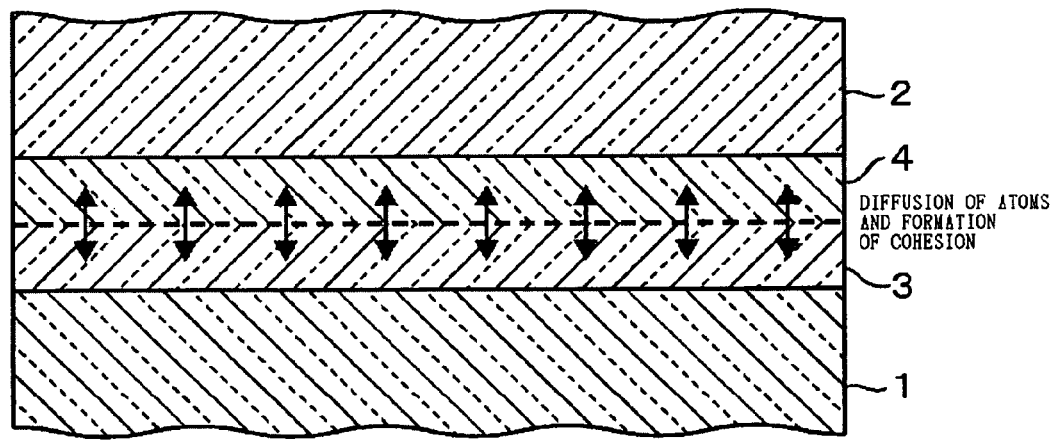

Fig. 5
(a)
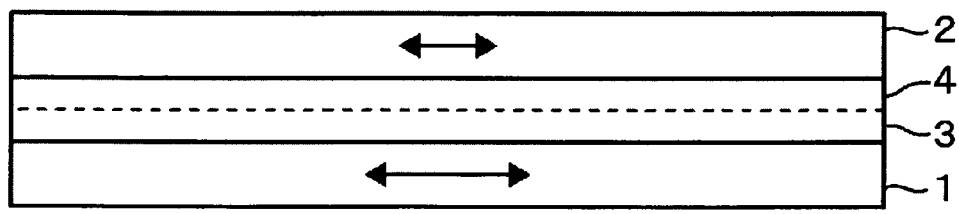
(b)
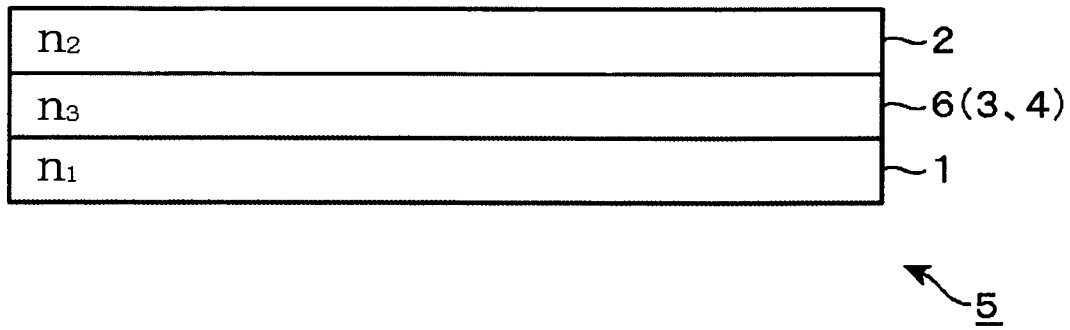

Fig. 6
(a)
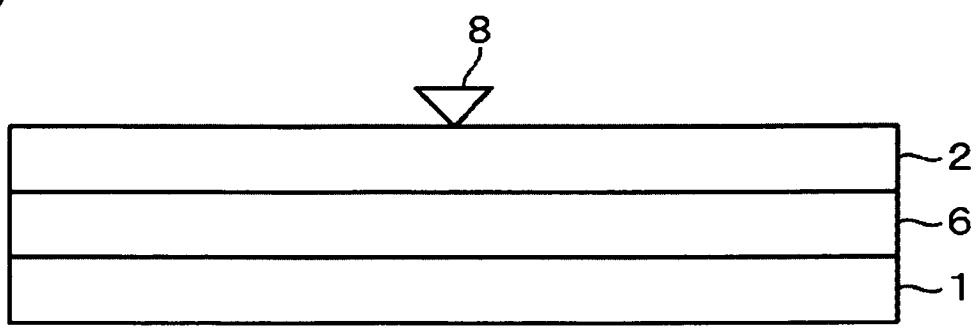
(b)
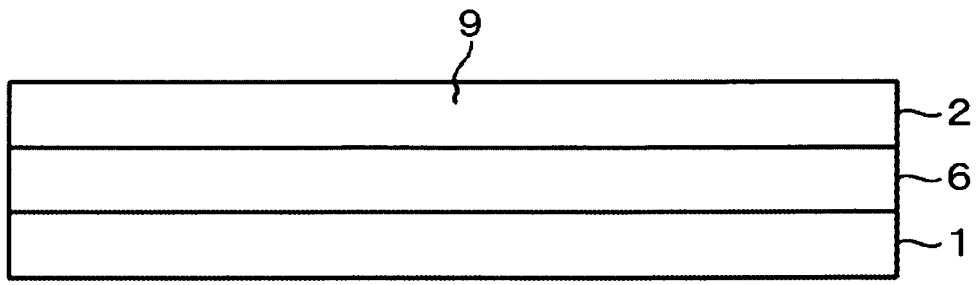

(a) Fig. 7
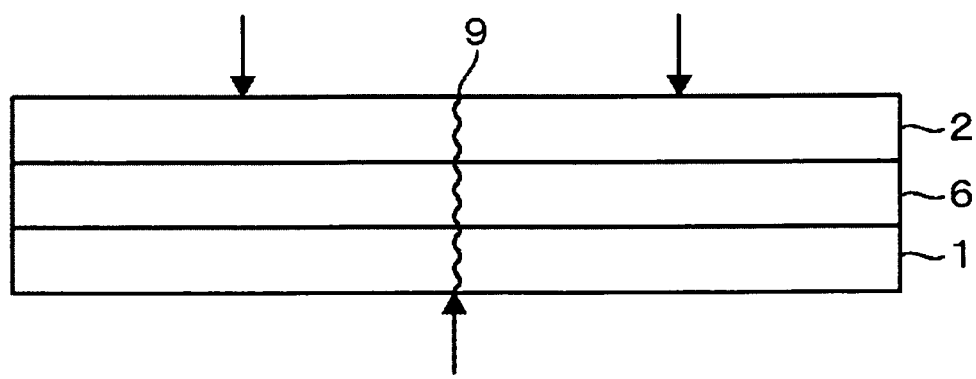
(b)
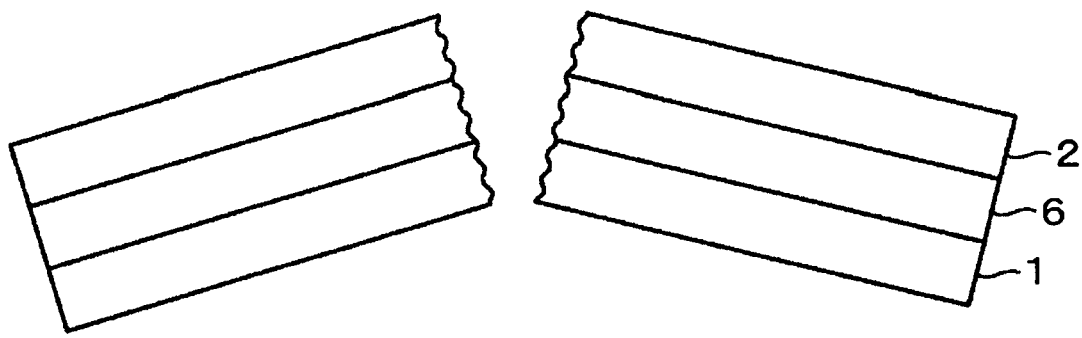

Fig. 8
(a)
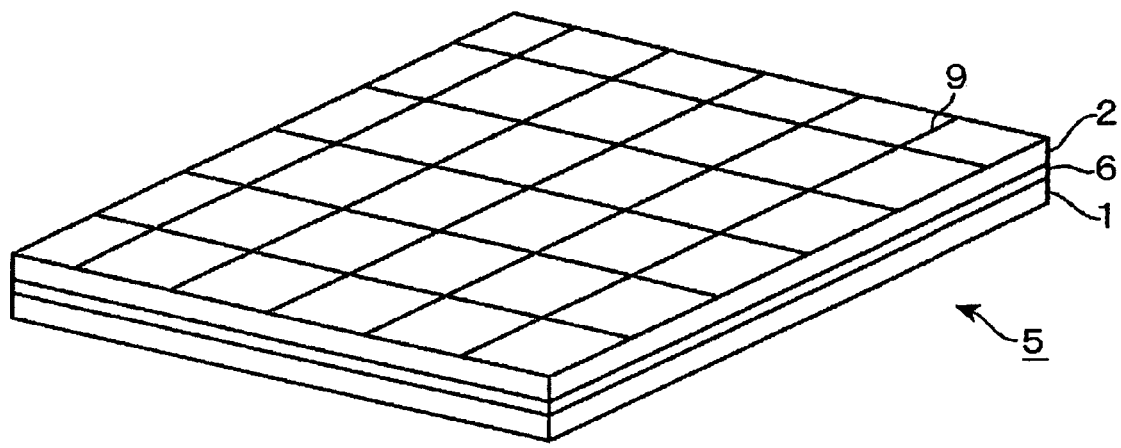
(b)
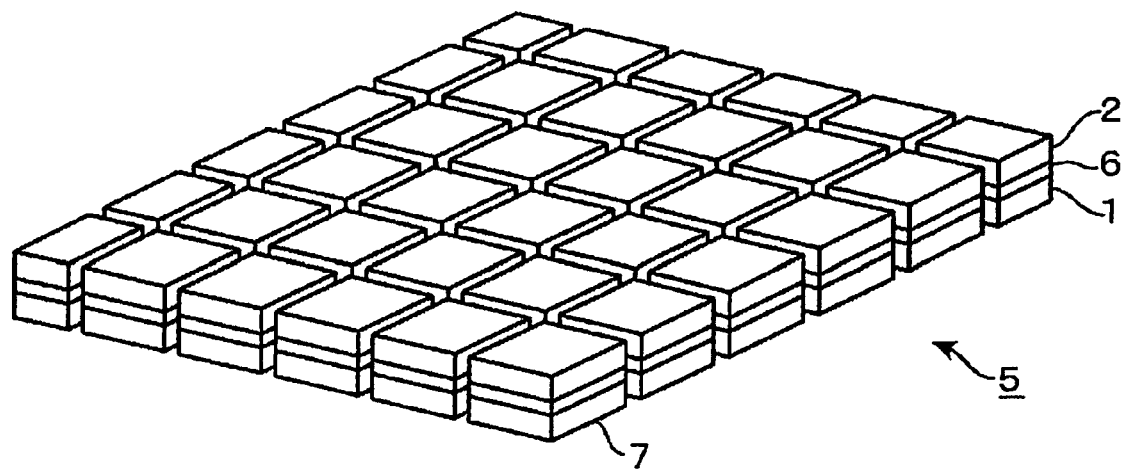

(a) Fig. 9
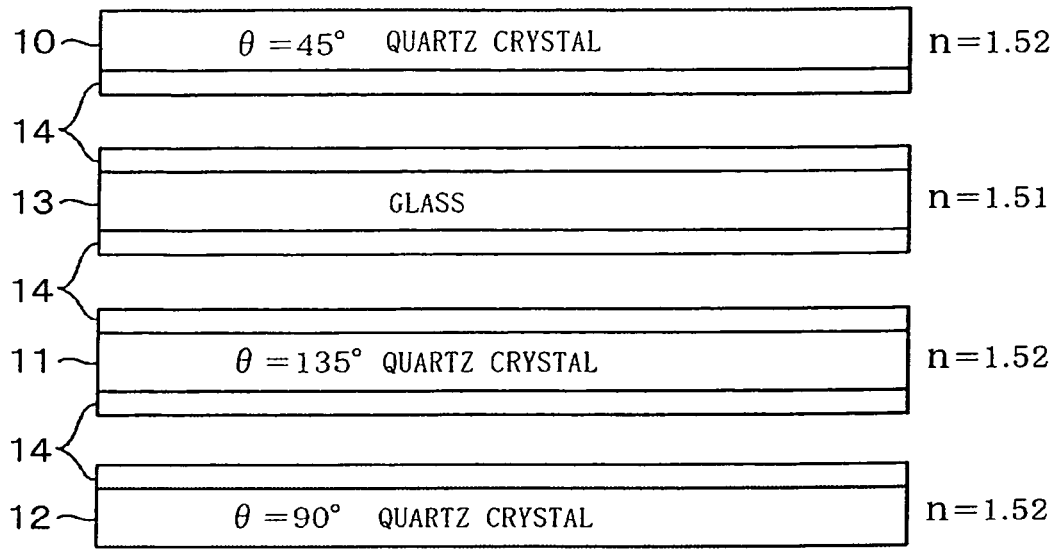
(b)
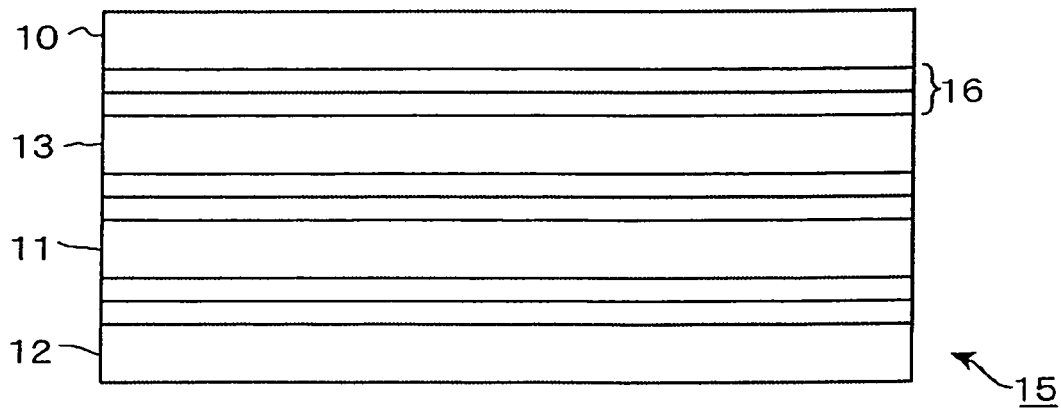
(c)
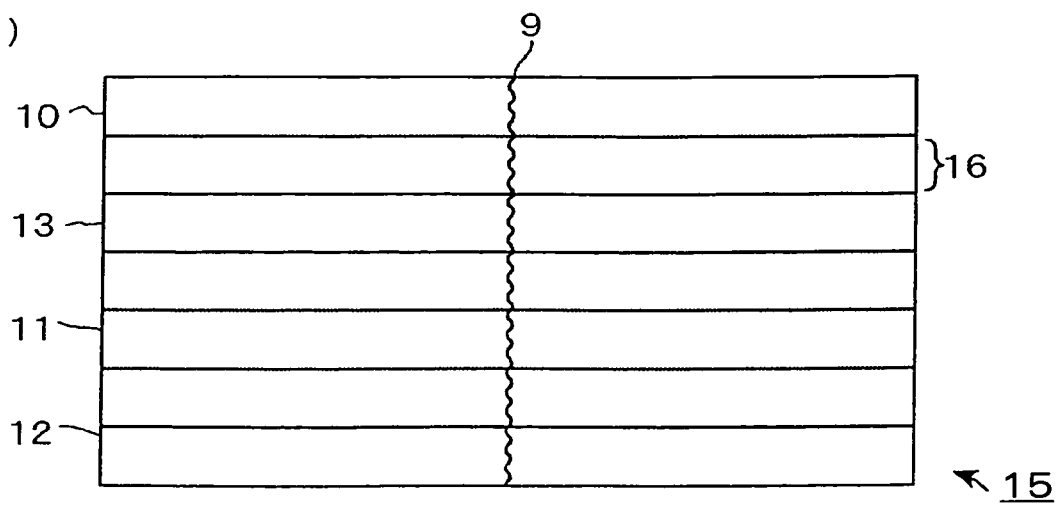

Fig. 10
(a)
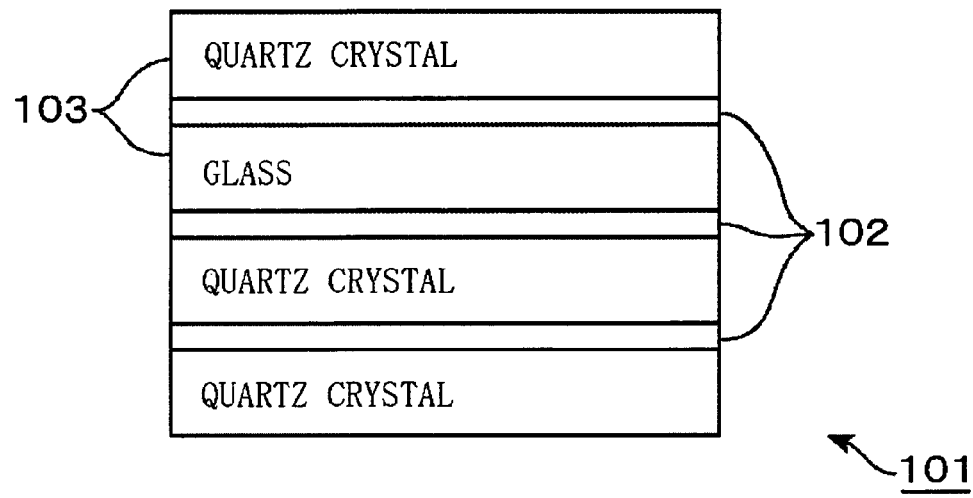
(b)
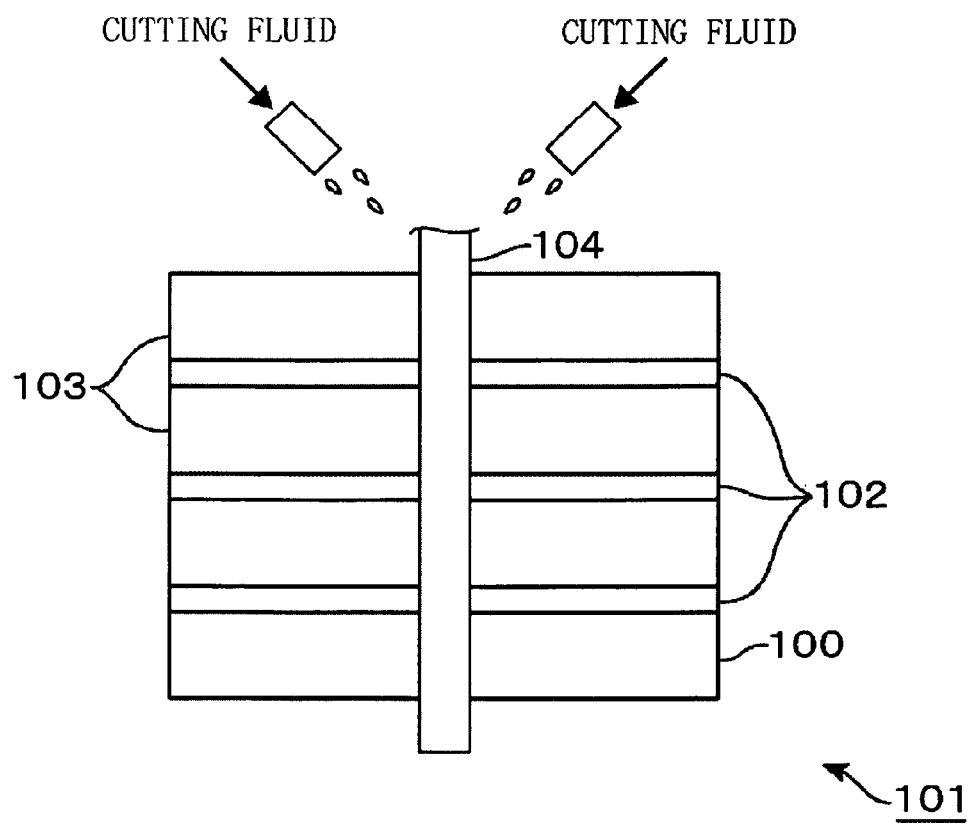

(a) Fig. 11
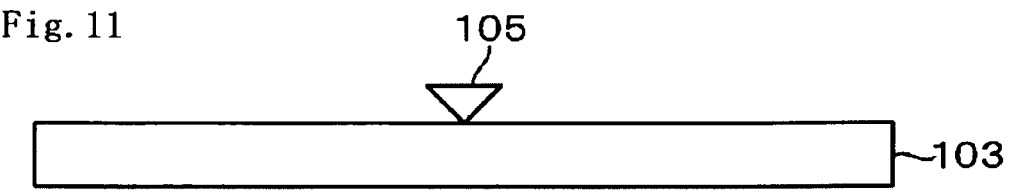
(b)
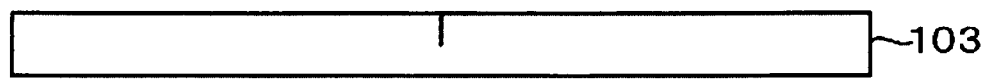
(c)
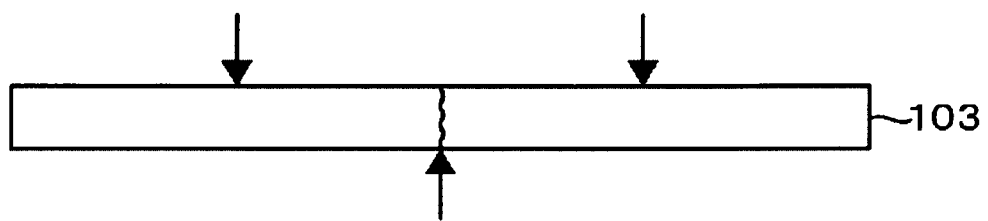
(d)
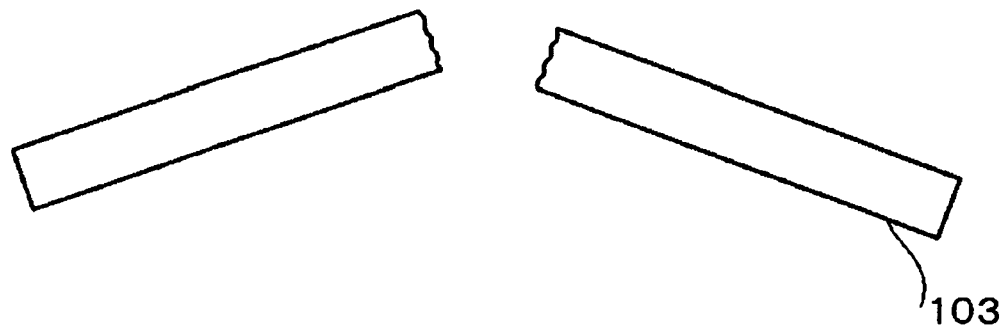

METHOD OF MANUFACTURING OPTICAL COMPONENT AND OPTICAL COMPONENT

BACKGROUND OF THE INVENTION

1. Field of the Invention

The present invention relates to a method of manufacturing an optical component used by transmitting light through an inside thereof and an optical component.

2. Description of the Related Art

As a material of an optical component such as an optical low-pass filter for a CCD element or a CMOS sensor for, for example, a digital camera, for example, a chip-shaped quartz crystal has been used. This optical component uses a phenomenon such that a chip is cut off so that, for example, directions of crystal axes of a quartz crystal are parallel to a horizontal surface of the chip and the crystal axes incline only at a predetermined angle to four sides of the horizontal surface of the chip, and by making light incident vertically on the horizontal surface of this chip, the incident light is separated into two rays that are an ordinary ray in which the light incident on the chip is transmitted through the chip linearly and an extraordinary ray that is emitted parallel to this ordinary ray at a position away from the ordinary ray only at a predetermined distance. The position where this extraordinary ray is emitted on a rear surface side of the chip changes in accordance with, for example, an inclination angle of the crystal axes of the quartz crystal to the four sides of the chip.

Accordingly, for example, in a stack in which a plurality of quartz-crystal chips whose inclination angles of crystal axes are different from one another are stacked to be integrated, light is vertically radiated toward a stacking direction of the quartz-crystal chips, and thereby, when a single incident ray is transmitted through the first quartz-crystal chip, it is increased to two rays, and when these two transmitted rays are transmitted through the following quartz-crystal chip, they are increased to, for example, four rays in total because each of the transmitted rays is increased to two rays. Then subsequently, every time the transmitted ray is transmitted through the following quartz-crystal chip, the number of transmitted rays is increased. Therefore, it is possible to increase the number of paths of light transmitted through the stack, or to adjust an arrangement (a disposition) of the transmitted rays transmitted through the stack (the ordinary ray and extraordinary ray) in accordance with the number of quartz-crystal chips to be stacked or an inclination angle of crystal axes in each of the quartz-crystal chips. Thus, as for an optical component using this quartz crystal, the number of chips to be stacked in the stack, an inclination angle of crystal axes in each of the quartz-crystal chips and the like are adjusted in accordance with, for example, the number of pixels of an image sensor provided at a position where light transmitted through this stack is reached, a disposition of the pixels, and the like. Further, in order to adjust an optical path length, there is sometimes a case that an amorphous glass chip is interposed between these quartz-crystal chips, alternatively, glass chips whose respective optical characteristics such as, for example, a transmission region and a non-transmission region of light, are different from each other are bonded to each other to be stacked, and it is interposed between the quartz-crystal chips.

Therefore, this stack is composed of a plurality of layers whose linear expansion coefficients are different from one another since an angle of the crystal axes is displaced between the respective quartz-crystal chips as described above, or a glass plate having a physical property different from that of the quartz crystal is interposed between the quartz-crystal chips, or further a physical property is different even between the adjacent glass plates. A chip-shaped optical component made of such a stack is cut out from a substrate as below, for example.

To begin with, a stack 101 is formed as shown in FIG. 10(a) in a manner that as shown in FIG. 2 that will be described later, a plurality of substrates 103 that are made of a plurality of quartz crystals in which a direction of a crystal axis is parallel to a horizontal surface and an inclination angle θ to one side of a perimeter of the horizontal surface is different from one another, an amorphous glass, and the like and whose linear expansion coefficients are different from one another are adhered to one another by, for example, an acrylic adhesive 102. Then, as shown in FIG. 10(b), a cutting fluid such as, for example, a cooling water or a lubricating oil is applied to this stack 101, and the stack 101 is cut off in a grid manner with a whetstone 104 for cutting off by a process called dicing, and thereby rectangular quartz-crystal chips 100 are cut out from the stack 101. At this time, a large number of flaws called chipping are generated at upper and lower corner portions on a cut surface of the quartz-crystal chip 100 by the dicing process, and therefore, in order to suppress a size of this flaw and the number of flaws, this dicing process is performed in a manner that, for example, a speed (process speed) at which the whetstone 104 incises the stack 101 is set to be an extremely slow speed, which is, for example, approximately several mm/min. Thereafter, as for this chip, the cutting fluid and a cutting residue adhering to a surface thereof are removed by washing.

On the other hand, as a process method in which a chip is cut out from the substrate 103 composed of, for example, a single plate, besides the above-described dicing process, a process method called, for example, scribing has been known. Concretely, this process method is a method to manufacture the rectangular quartz-crystal chip 100 in a manner that as shown in FIG. 11(a), for example, firstly, for example, a sharp diamond cutting edge 105 or the like is pressed against a surface of the substrate 103, and as shown in FIG. 11(b), a linear crack is formed in a grid manner along an outer edge of a chip, and next, as shown in FIG. 11(c), by adding loads to the substrate 103 and propagating this crack in a thickness direction of the substrate 103, the substrate 103 is cut off, and as shown in FIG. 11(d), the substrate 103 is split (broken).

In this process method, the process is easy to be performed since only the crack is formed in the surface of the substrate 103 in the process performed by the diamond cutting edge 105, and therefore it is possible to run the diamond cutting edge 105, for example, approximately several tens times faster than the whetstone 104, and therefore to perform the process faster than the already-described dicing process. Accordingly, productivity is improved more than that of the dicing process, and the number of process apparatuses is also reduced. Further, the scribing process is performed only in a manner that the substrate 103 has the crack formed in the surface, thereby being cut off into chips as described above, so that it is possible to suppress a size of a flaw and the number of flaws more than the dicing process. Further, a cutting fluid is unnecessary for this scribing process, so that it is possible to simplify washing of the chip after being processed and processing of a waste liquid.

Thus, it is desirable that the above-described stack 101 is also processed by this scribing. However, this stack 101 has the adhesive 102 to be a buffer material interposed between the respective substrates 103 and 103 as described above, and this adhesive 102 does not cause a brittle fracture, so that the propagation of the crack from an upper layer is obstructed. Therefore, as shown in FIG. 12, the crack is not easily reached at the substrate 103 on a lower layer side as it goes toward the substrate 103 on the lower layer side, and it is difficult to cut off this stack 101.

On the other hand, as disclosed in Patent Document 1, for example, there has been known a method in which the plural substrates 103 are bonded directly without such an adhesive 102 interposed therebetween. This method is a method in a manner that a molecule including, for example, oxygen (O), hydrogen (H), and the like is interposed between the substrates 103 and 103 to be heated at, for example, approximately 400° C., and thereby the plural substrates 103 are bonded with strong cohesion between the molecules. This method is considered to enable the crack to be formed integrally in the stack 101 by the scribing because the adhesive 102 is not interposed between the substrates 103 and 103. However, this stack 101 is composed of the plural substrates 103 whose linear expansion coefficients are different respectively as described already, and a proportion of which the substrate 103 expands and shrinks by heating and cooling at bonding differs in each of the substrates 103, and therefore, there arises a case that a break is caused in the substrate 103 at bonding processing, or the substrates 103 cannot be bonded.

In Patent Document 2, there has been disclosed an art in which when directly bonding two substrates having different linear expansion coefficients, a substrate having substantially the same linear expansion coefficient as that of the substrate on one side is interposed between the two substrates, but this method makes the stack 101 extremely thick.

[Patent Document 1] Japanese Patent Application Laid-open No. 2006-248895 (paragraphs (0113) to (0126))

[Patent Document 2] Japanese Patent Application Laid-open No. Hei 07-086106 (paragraphs (0008) and (0009))

SUMMARY OF THE INVENTION

The present invention is made based on such circumstances, and an object thereof is to provide a method of manufacturing an optical component in which a piece for an optical component composed of a stack of a plurality of substrates having linear expansion coefficients different from one another can be obtained by scribing, and an optical component.

A method of manufacturing an optical component of the present invention is a method of manufacturing an optical component used by transmitting light through an inside thereof, the method is characterized in that it includes:

a step of forming a first buffer layer made of an amorphous inorganic substance causing a brittle fracture on a surface of a first substrate made of an optical material substrate;

a step of forming a second buffer layer made of an amorphous inorganic substance causing a brittle fracture on a surface of a second substrate made of an optical material substrate having a linear expansion coefficient different from that of the first substrate;

a step of then stacking the first buffer layer and the second buffer layer to perform a heat treatment, and bonding both of the substrates via the first buffer layer and the second buffer layer to obtain a stack; and a step of thereafter cutting off the stack in a stacking direction by a scribing process to obtain a piece for an optical component.

It is preferable that refractive indexes of the first buffer layer and the second buffer layer are equal to or less than 2.5 respectively.

It is preferable that the first buffer layer and the second buffer layer are one of a metal, a metal oxide, and a metal fluoride respectively.

It is preferable that the first buffer layer and the second buffer layer are formed by a sputtering method or a vapor deposition method respectively.

An optical component of the present invention is an optical component used by transmitting light through an inside thereof, the optical component is characterized in that it includes:

a first substrate made of an optical material substrate;

a second substrate made of an optical material substrate having a linear expansion coefficient different from that of the first substrate; and a buffer layer formed between the first substrate and the second substrate and made of an amorphous inorganic substance causing a brittle fracture.

According to the present invention, when bonding substrates having linear expansion coefficients different from each other in order to manufacture an optical component used by transmitting light through an inside thereof, buffer layers made of an amorphous inorganic substance causing a brittle fracture are formed on bonding surfaces of the respective substrates, and the buffer layers are bonded to each other by a heat treatment, so that stress generated at the heat treatment due to the difference of the linear expansion coefficients between the substrates is relaxed by the buffer layers and a stack can be formed by securely integrating even the substrates having linear expansion coefficients different from each other. Therefore, a buffer material obstructing propagation of a crack is not interposed between the substrates, so that it is possible to cut off this stack integrally by a scribing process and obtain the optical component simply.

BRIEF DESCRIPTION OF THE DRAWINGS

FIG. 3(a), FIG. 3(b), and FIG. 3(c) are schematic views showing parts of the above-described steps of the method of manufacturing the optical component;

FIG. 4(a) and FIG. 4(b) are schematic views showing parts of the above-described steps of the method of manufacturing the optical component;

FIG. 5(a) and FIG. 5(b) are schematic views showing parts of the above-described steps of the method of manufacturing the optical component;

FIG. 6(a) and FIG. 6(b) are schematic views showing parts of the above-described steps of the method of manufacturing the optical component;

FIG. 7(a) and FIG. 7(b) are schematic views showing parts of the above-described steps of the method of manufacturing the optical component;

FIG. 8(a) and FIG. 8(b) are schematic views showing parts of the above-described steps of the method of manufacturing the optical component;

FIG. 9(a), FIG. 9(b), and FIG. 9(c) are schematic views showing one example of steps in another embodiment of the above-described method of manufacturing the optical component;

FIG. 10(a) and FIG. 10(b) are schematic views showing a conventional method of manufacturing an optical component;

FIG. 11(a), FIG. 11(b), FIG. 11(c), and FIG. 11(d) are schematic views showing a conventional method of manufacturing an optical component.

DETAILED DESCRIPTION OF THE PREFERRED EMBODIMENT(S)

Figure 1:
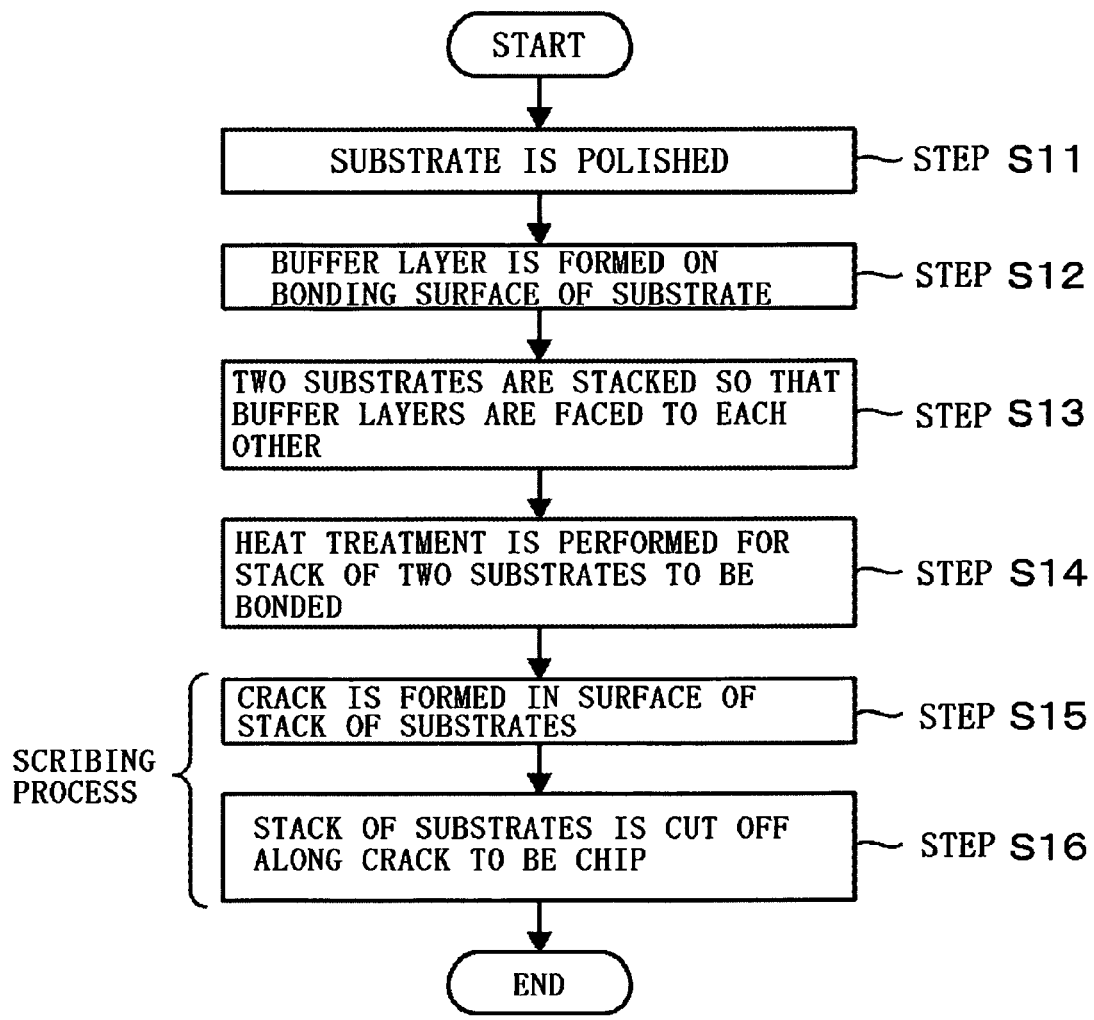
FIG. 1 is a flow chart showing one example of steps of a method of manufacturing an optical component of the present invention.
Figure 2:
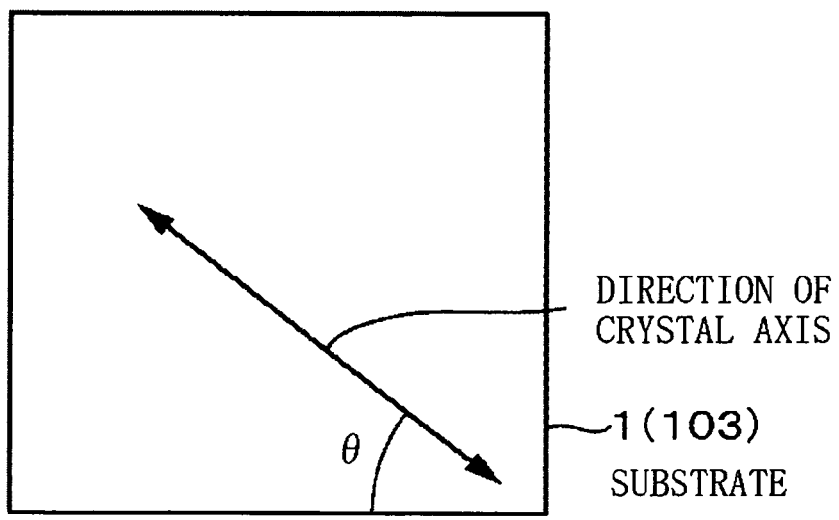
FIG. 2 is a schematic view showing a characteristic of a quartz crystal being a substrate used for the present invention.
Figure 12:
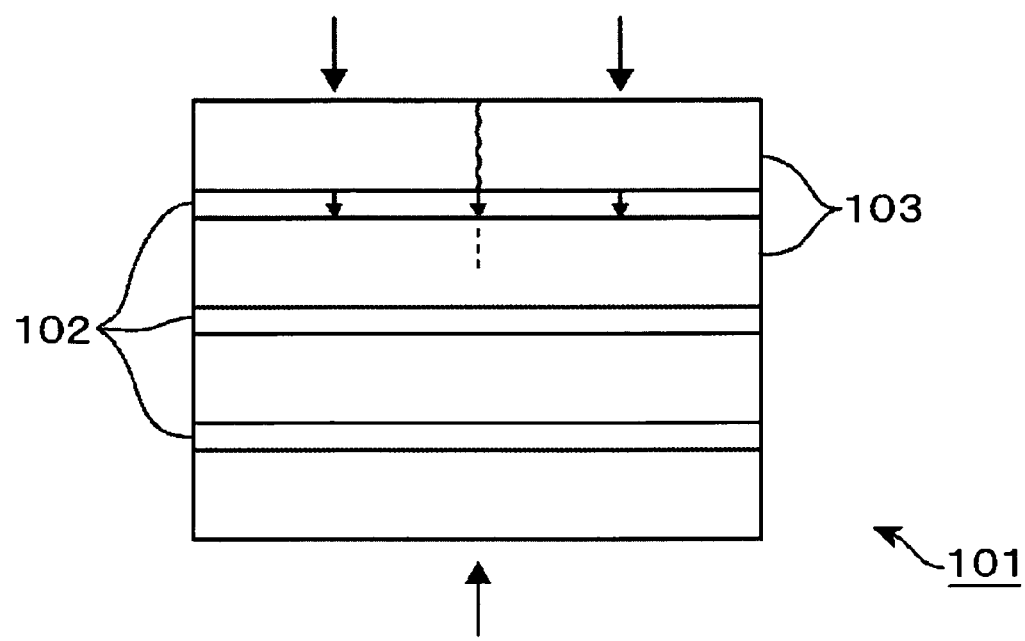
FIG. 12 is a schematic view showing the conventional method of manufacturing the optical component.

As a first embodiment of a method of manufacturing an optical component of the present invention, there will be explained the case when a first substrate and a second substrate being optical material substrates having linear expansion coefficients different from each other are bonded based on a flow chart shown in FIG. 1. To begin with, these substrates 1, 2 will be explained. As shown in FIG. 2, the substrates 1, 2 are each made of plate-shaped quartz crystal whose sizes of horizontal surfaces are, for example, 40.5 mm×48 mm, and thickness dimensions thereof are, for example, 0.3 mm, 0.3 mm respectively. Further, these substrates 1, 2 are adjusted so that directions of crystal axes (Z axes) are parallel to the horizontal surfaces of the respective substrates 1, 2, and an inclination angle θ formed by the direction of the crystal axis and one side (a side on a lower side in FIG. 2 in this example) is, for example 45° in the substrate 1, and it is, for example 135° in the substrate 2, in other words, the directions of the crystal axes are perpendicular to each other between the substrates 1 and 2. The linear expansion coefficients of these substrates 1, 2 are $13.1 \times 10^{-6}$/K in a direction vertical to the Z axis and $7.1 \times 10^{-6}$/K in a direction parallel to the Z axis. Accordingly, when these substrates 1, 2 are stacked in a thickness direction, for example, the linear expansion coefficients in a surface direction are different from each other. Further, refractive indexes $n_1$, $n_2$ of these substrates 1, 2 are 1.54, 1.54 respectively.

Firstly, the horizontal surfaces of these substrates 1, 2 shown in FIG. 3(a) are polished to be smooth as shown in FIG. 3(b) by using, for example, a double side polishing apparatus (Step S11). Next, by using, for example, a sputtering apparatus, an ion beam assisted (IAD) vapor deposition apparatus, an ion beam sputtering (IBS) apparatus, a radical assisted sputtering (RAS) apparatus, or the like, a first buffer layer 3 and a second buffer layer 4 whose layer thicknesses are, for example, 70 nm to 700 nm respectively, and that are transparent, and whose refractive indexes are, for example, 1.63 to 1.7, preferably, 1.67, and that are made of an inorganic substance causing a brittle fracture, which is, for example, an aluminum oxide ($Al_2O_3$; alumina) are formed on surfaces of these substrates 1, 2 (Step S12). By performing layer forming processing by using the apparatus as described above, as shown in FIG. 3(c), the respective buffer layers 3, 4 become smooth, dense and amorphous (amorphousness) to follow shapes of the surfaces of the substrates 1, 2. Further, the respective buffer layers 3, 4 adhere to the substrates 1, 2 on a lower layer side with a strong cohesive strength respectively.

Then, as shown in FIG. 4(a), the first substrate 1 and the second substrate 2 are stacked so that the first buffer layer 3 and the second buffer layer 4 are faced to each other (Step S13). Next, a heat treatment is performed at, for example 500° C. and for a predetermined period of time in, for example, a vacuum atmosphere (Step S14). By this heat treatment, as shown in FIG. 4(b), diffusion of atoms occurs between the buffer layers 3 and 4, or alternatively cohesion is generated between atoms, so that, in a sense, an interface between the buffer layers 3 and 4 disappears, and the buffer layers 3, 4 are bonded directly, and the substrates 1, 2 are integrated via the buffer layers 3, 4, and a stack 5 is formed.

At this time, the substrates 1, 2 tend to expand in, for example, a horizontal direction by the heat treatment, but respective expansion ratios (expanding lengths) differ as shown in FIG. 5(a), for example since the respective linear expansion coefficients are different as described already. Thus, when the substrates 1, 2 are directly brought into contact with each other to be bonded, there is sometimes a case that stress is generated between the substrates 1 and 2 due to a difference between expansion amounts at heating or a difference between shrinkage amounts at cooling after the heat treatment, which leads the substrates 1, 2 to be broken, or alternatively they cannot be bonded. However, the amorphous buffer layers 3, 4 are interposed between the substrates 1 and 2, and an amorphous state can be substantially maintained because the buffer layers 3, 4 are not crystallized by this heat treatment, or alternatively, even when the buffer layers 3, 4 are crystallized partially. Therefore, each difference in expansion and shrinkage ratios between the substrates 1 and 2 and stress generated by this difference are reduced by these buffer layers 3, 4. In other words, when seen microscopically, the buffer layers 3, 4 expand and shrink in accordance with the expansion and shrinkage of the substrates 1, 2 in a state where the buffer layers 3, 4 strongly adhere to the substrates 1, 2 in vicinities of the substrates 1, 2, and further expansion and shrinkage amounts become small as they go farther from the surfaces of the substrates 1, 2, and the buffer layers 3, 4 hardly expand and shrink in a boundary vicinity between the buffer layers 3 and 4, or alternatively, the expansion and shrinkage amounts become small to a level where the expansion and shrinkage amounts can be negligible. Accordingly, the substrates 1, 2 are bonded integrally by the buffer layers 3, 4 while the break or deformation by the stress is suppressed.

At this time, when the first buffer layer 3 and the second buffer layer 4 interposed between the substrates 1 and 2 are set as a bonding layer 6 as shown in FIG. 5(b), a refractive index $n_3$ of this bonding layer 6 is, for example, 1.63 to 1.7, preferably, 1.67. Therefore, the refractive indexes $n_1$, $n_2$, and $n_3$ of the stack 5 become substantially the same. Thereafter, a scribing process is performed for this stack 5 as below.

Firstly, as shown in FIG. 6(a), a surface of the stack 5 is moved at a speed of, for example, approximately 10,000 mm/sec while a diamond cutting edge 8 or the like is pressed against the surface, and as shown in FIG. 6(b) and FIG. 8(a), a crack 9 is formed in the surface of the stack 5 in a grid manner in accordance with a shape of a quartz-crystal chip 7 to be the optical component (Step S15). Then, as shown in FIG. 7(a), for example, a portion where this crack 9 is formed is pressed (supported) from the lower side, and at the same time, loads are added to, for example, two points from above to sandwich this crack 9 (Step S16). At this time, the substrates 1, 2 are materials causing a brittle fracture since they are made of quartz crystal, and further the bonding layer 6 interposed between the substrates 1 and 2 is also a material causing a brittle fracture made of alumina. Accordingly, when the loads are added to the points as described above, the crack 9 is propagated through the stack 5 in a thickness direction as shown in FIG. 7(a), and thereafter the crack 9 is reached to a lower surface of the stack 5, and thereby the stack 5 is cut off (broken) integrally in a stacking direction of the substrates 1, 2, as shown in FIG. 7(b). As described above, the cutting off based on the crack 9 is repeated, and thereby, as shown in FIG. 8(b), the plural quartz-crystal chips 7, which are pieces whose sizes are, for example, approximately 7 mm×8 mm, are segmented. Thereafter, this quartz-crystal chip 7 is, for example, washed, and then is to be used as the optical component in which light is transmitted through the quartz-crystal chip 7. Note that actually, the crack 9 is extremely small, but this crack 9 is shown schematically in FIGS. 6(a) and 6(b), and FIGS. 7(a) and 7(b), which are described above.

According to the above-described embodiment, when bonding the substrates 1, 2 having linear expansion coefficients different from each other, the buffer layers 3, 4 made of an amorphous inorganic substance causing a brittle fracture are formed on the respective bonding surfaces of the substrates 1, 2 and are bonded by the heat treatment, resulting that the substrates 1, 2 are bonded integrally. Therefore, since these buffer layers 3, 4 reduce a difference in expansion and shrinkage ratios between the substrates 1 and 2 at the heat treatment and stress generated by this difference, even the substrates 1, 2 having linear expansion coefficients different from each other can be bonded. Further, an elastic body obstructing the propagation of the crack 9 as a buffer material such as, for example, an adhesive is not interposed between the substrates 1 and 2, so that the crack 9 is propagated in a thickness direction when performing the scribing process and the stack 5 can be cut off easily and securely. Accordingly, a process speed by the diamond cutting edge 8 can be made much faster than that by a whetstone at a dicing process described already, so that it is possible to improve productivity and further suppress the number of process (cutoff) apparatuses. Further, it is also possible to suppress a size of a flaw and the number of flaws compared with the dicing process, and to simplify washing after cutting off and processing of a waste liquid.

Further, since the buffer layers 3, 4 to be interposed between the substrates 1 and 2 have the extremely small refractive indexes as described already, the optical component can be manufactured with high productivity as described above while reflection of light is suppressed in the buffer layers 3, 4 and a deterioration of a function as the optical component is suppressed to a minimum. At this time, the bonding layer 6 composed of these buffer layers 3, 4 is formed so that a layer thickness thereof is extremely thin as described already, and therefore, an increase in size of the optical component can be suppressed.

Further, when directly bonding the buffer layers 3, 4 to each other, the surfaces of the substrates 1, 2 are polished, and then the buffer layers 3, 4 are formed, so that the surfaces of the buffer layers 3, 4 also become smooth. Therefore, when bonding, the surfaces of the buffer layers 3, 4 get in contact with each other uniformly, so that the substrates 1, 2 can be bonded with a strong cohesive strength over the surfaces.

Furthermore, the dense buffer layers 3, 4 are formed by forming the buffer layers 3, 4 by a layer forming method as described above, so that the substrates 1, 2 can be bonded with an extremely strong bonding strength.

Note that when bonding the substrates 1, 2, the substrates 1, 2 may be bonded directly in a manner that for example, the buffer layer 3 (4) is formed only on the substrate 1 (2) on one side, and the buffer layer 4 (3) is not formed on the substrate 2 (1) on the other side, but it is preferable that the buffer layers 3, 4 are formed on both the surfaces of the substrates 1, 2 in order to suppress an influence of expansion and shrinkage between the substrates 1 and 2 as described already.

In the above-described example, the explanation is conducted in such a way that quartz crystal is cited as the substrates 1, 2 being optical material substrates as an example, but the present invention may be applied to not only the bonding of quartz crystals but also bonding of, for example, optical glasses having linear expansion coefficients different from each other because optical characteristics thereof are different. Further, the present invention may also be applied to the case when materials made of a silicon oxide such as, for example, quartz crystal, quartz, or glass and having physical properties different from each other are bonded.

Further, in the above-described embodiment, the stack 5 in which the two substrates 1, 2 are bonded is explained, but the present invention can also be applied to the case when two or more substrates are bonded. Such an example will be explained with reference to FIGS. 9(a), 9(b), and 9(c). In this example, as shown in FIG. 9(a), substrates 10, 11, and 12 made of quartz crystals whose refractive indexes n are 1.52, 1.52, and 1.52 respectively and whose inclination angles θ are 45°, 135°, and 90° respectively are stacked in this order from an upper side, and a glass substrate 13 whose refractive index is, for example, 1.51 is interposed between the substrates 10 and 11.

Then, similarly to the above-described example, after upper and lower surfaces of these substrates 10 to 13 are polished, buffer layers 14 made of, for example, alumina are formed on bonding surfaces of the substrates 10 to 13, namely on the lower surface of the substrate 10, the upper and the lower surfaces of the glass substrate 13 and the substrate 11, and the upper surface of the substrate 12 as described already. Then, as shown in FIG. 9(b), these substrates 10 to 13 are stacked, and by performing a heat treatment, the substrates 10 to 13 are bonded integrally via bonding layers 16 composed of the buffer layers 14, 14 faced to each other, and a stack 15 is formed. Next, by performing a scribing process as shown in FIG. 9(c), in the stack 15 that is multilayered as above as well, a crack 9 is similarly propagated in a thickness direction and the stack 15 is cut off integrally.

In this embodiment as well, an effect similar to that of the already-described example can be obtained. Further, even the several substrates 10 to 13 as descried above can be bonded and cut off, and further, even the glass substrate 13 different in material from quartz crystal can be integrated into the stack 15 and cut off, so that an optical component having high functionality can be manufactured simply.

As the already-described buffer layers 3, 4, besides alumina, one of a metal, a metal oxide and a metal fluoride may be applied, and concretely, one or more types selected from an oxide (alumina, silicon dioxide ($SiO_2$), zirconium dioxide ($ZrO_2$)) including one of aluminum, silicon, and zirconium and a fluoride (2 magnesium fluoride ($MgF_2$), lithium fluoride (LiF), 2 strontium fluoride ($SrF_2$)) including one of magnesium, lithium, and strontium may be applied. Further, besides these materials, an inorganic fluoride whose refractive index is equal to or less than 2.5, such as, for example, $CeF_3$ (cerium fluoride) may be applied. In other words, an inorganic substance that is transparent and that causes a brittle fracture may be applied.

Note that as the above-described buffer layers 3, 4, and 14, the respective materials may be different, or layer thicknesses of the respective buffer layers 3, 4, and 14 may be different. At this time, in the case when thicknesses of the bonding layers 6, 16 between the two substrates 1 and 2 (10 and 13) to be bonded are, for example, equal to or less than 0.001 mm, an action relaxing stresses of the substrates 1, 2 (10, 13) at a heat treatment by the bonding layers 6, 16 becomes weak, and further in the case when the thicknesses are equal to or more than 0.02 mm, a size of the quartz-crystal chip 7 is increased. Therefore, the thicknesses are preferable to be 0.01 mm to 0.003 mm.

What is claimed is:
1. A method of manufacturing an optical component used by transmitting light through an inside thereof, the method comprising:

a step of forming a first buffer layer made of an amorphous inorganic substance causing a brittle fracture on a surface of a first substrate made of an optical material substrate;

a step of forming a second buffer layer made of an amorphous inorganic substance causing a brittle fracture on a surface of a second substrate made of an optical material substrate having a linear expansion coefficient different from that of the first substrate;

a step of then stacking the first buffer layer and the second buffer layer to perform a heat treatment, and bonding both of the substrates via the first buffer layer and the second buffer layer to obtain a stack; and a step of thereafter cutting off the stack in a stacking direction by a scribing process to obtain a piece for an optical component.

2. The method of manufacturing the optical component according to claim 1, wherein
refractive indexes of the first buffer layer and the second buffer layer are equal to or less than 2.5 respectively.

3. The method of manufacturing the optical component according to claim 1, wherein
the first buffer layer and the second buffer layer are one of a metal, a metal oxide, and a metal fluoride respectively.

4. The method of manufacturing the optical component according to claim 1, wherein
the first buffer layer and the second buffer layer are formed by a sputtering method or a vapor deposition method respectively.

5. The method of manufacturing the optical component according to claim 2, wherein
the first buffer layer and the second buffer layer are one of a metal, a metal oxide, and a metal fluoride respectively.

* * * * *